United States Patent
Vue et al.

(10) Patent No.: US 9,783,309 B2
(45) Date of Patent: Oct. 10, 2017

(54) METHODS AND DEVICE FOR MIXING AIRFLOWS IN ENVIRONMENTAL CONTROL SYSTEMS

(71) Applicant: The Boeing Company, Seal Beach, CA (US)

(72) Inventors: Fue Chue Vue, Mill Creek, WA (US); David W. Mullenix, Arlington, WA (US)

(73) Assignee: The Boeing Company, Chicago, IL (US)

( * ) Notice: Subject to any disclaimer, the term of this patent is extended or adjusted under 35 U.S.C. 154(b) by 548 days.

(21) Appl. No.: 13/943,272

(22) Filed: Jul. 16, 2013

(65) Prior Publication Data

US 2015/0021006 A1 Jan. 22, 2015

(51) Int. Cl.
*B64D 13/08* (2006.01)
*F24F 13/04* (2006.01)
*B64D 13/06* (2006.01)

(52) U.S. Cl.
CPC .............. *B64D 13/08* (2013.01); *F24F 13/04* (2013.01); *B64D 2013/0688* (2013.01); *Y02T 50/44* (2013.01); *Y02T 50/56* (2013.01)

(58) Field of Classification Search
CPC ................................ F24F 13/04; B64D 13/08
USPC .................... 165/263; 454/160, 261
See application file for complete search history.

(56) References Cited

U.S. PATENT DOCUMENTS

| | | | | |
|---|---|---|---|---|
| 1,113,041 A * | 10/1914 | Murphy | .............. | F02M 1/00 138/37 |
| 2,884,846 A * | 5/1959 | Goodman | .............. | B64D 13/00 165/42 |
| 3,313,577 A * | 4/1967 | Wolfe | .............. | B65G 53/521 406/46 |
| 3,719,207 A * | 3/1973 | Takeda | .............. | B65G 53/521 366/165.2 |
| 4,015,574 A * | 4/1977 | Hanff | .............. | F02M 29/06 123/590 |
| 4,445,342 A * | 5/1984 | Warner | .............. | B64D 13/06 236/13 |
| 4,466,741 A * | 8/1984 | Kojima | .............. | B01F 5/0615 138/37 |
| 4,495,858 A * | 1/1985 | Erickson | .............. | B01F 5/0616 454/261 |
| 4,747,697 A * | 5/1988 | Kojima | .............. | B01F 5/0615 138/39 |

(Continued)

FOREIGN PATENT DOCUMENTS

DE 3536315 A * 4/1987
DE EP 1400381 A1 * 3/2004 ......... B60H 1/00564

(Continued)

OTHER PUBLICATIONS

Office Action of Canadian Patent Application No. 2,848,491, Nov. 16, 2015, 6 pages.

*Primary Examiner* — Devon Russell
(74) *Attorney, Agent, or Firm* — Felix L. Fischer

(57) ABSTRACT

Methods and a device for mixing airflows in an environmental control system are provided. The device includes a duct configured to receive a first airflow and a second airflow, and a plurality of guide vanes disposed within said duct. The guide vanes are configured to induce rotation of the first and second airflows flowing through the duct.

15 Claims, 3 Drawing Sheets

(56) References Cited

U.S. PATENT DOCUMENTS

| | | | | |
|---|---|---|---|---|
| 4,929,088 | A * | 5/1990 | Smith | B01F 5/0473 138/40 |
| 5,051,213 | A | 9/1991 | Weske | |
| 5,104,233 | A * | 4/1992 | Kojima | B01F 5/0646 138/39 |
| 5,145,124 | A | 9/1992 | Brunskill et al. | |
| 5,356,213 | A * | 10/1994 | Arpentinier | B01F 5/045 366/165.1 |
| 5,364,305 | A * | 11/1994 | Zieve | F24F 13/04 454/261 |
| 5,536,207 | A * | 7/1996 | Robinson | B01F 5/0602 454/261 |
| 5,605,400 | A * | 2/1997 | Kojima | B01F 5/061 366/339 |
| 5,800,059 | A * | 9/1998 | Cooke | B01F 5/0656 138/40 |
| 6,168,517 | B1 | 1/2001 | Cook | |
| 6,276,440 | B1 * | 8/2001 | Kaga | F24F 1/0011 165/122 |
| 6,595,848 | B1 * | 7/2003 | Robinson | F24F 13/04 454/261 |
| 6,615,872 | B2 * | 9/2003 | Goebel | B01F 5/064 138/37 |
| 6,619,589 | B2 | 9/2003 | Brasseur et al. | |
| 6,776,194 | B2 * | 8/2004 | Houston | A61F 2/06 138/108 |
| 6,878,056 | B2 | 4/2005 | Robinson | |
| 6,971,607 | B2 | 12/2005 | McColgan et al. | |
| 6,997,214 | B2 * | 2/2006 | Kuo | F15D 1/02 138/109 |
| 7,059,400 | B2 | 6/2006 | Sekhar et al. | |
| 7,114,524 | B2 * | 10/2006 | Houston | A61F 2/06 138/177 |
| 7,416,573 | B2 * | 8/2008 | Lindgren | A62C 3/04 55/315 |
| 7,644,733 | B2 * | 1/2010 | Jones | F15D 1/065 138/177 |
| D625,771 | S * | 10/2010 | Kojima | D23/200 |
| 8,017,068 | B2 | 9/2011 | Dengel et al. | |
| 8,033,714 | B2 * | 10/2011 | Nishioka | B01D 53/8631 137/888 |
| 8,413,932 | B2 | 4/2013 | De Roche | |
| 8,459,017 | B2 * | 6/2013 | Paterson | B01F 3/02 138/38 |
| 8,956,040 | B2 * | 2/2015 | Cornaglia | F01N 3/2892 366/337 |
| 9,010,994 | B2 * | 4/2015 | McQueen | B01F 5/0618 366/337 |
| 9,017,068 | B2 * | 4/2015 | Maekawa | C21B 9/10 431/187 |
| 2004/0156714 | A1 | 8/2004 | Seitz | |
| 2005/0241605 | A1 * | 11/2005 | Bedwell | F02M 29/14 123/184.21 |
| 2006/0183419 | A1 * | 8/2006 | Kettler | F24F 11/0009 454/261 |
| 2013/0061802 | A1 | 3/2013 | Imano et al. | |

FOREIGN PATENT DOCUMENTS

| | | | | |
|---|---|---|---|---|
| DE | 102004058144 B3 * | 8/2006 | | F24F 13/04 |
| EP | 0796413 B1 | 7/2001 | | |
| EP | 2028344 A1 | 2/2009 | | |
| EP | 1312493 B1 | 8/2009 | | |
| FR | 2937692 A3 * | 4/2010 | | B01F 3/04049 |
| JP | 05118632 A * | 5/1993 | | |

* cited by examiner

METHODS AND DEVICE FOR MIXING AIRFLOWS IN ENVIRONMENTAL CONTROL SYSTEMS

BACKGROUND

The present disclosure relates generally to ventilation systems and, more particularly, to methods and systems for mixing airflows in environmental control systems.

In some known aircraft environmental control systems (ECSs), bleed from the aircraft's engines is injected as trim air into a conditioned air flow duct to adjust (i.e., raise) the temperature of the air supplied to the cabin or other compartment within the aircraft. The temperature of the trim air mixed with the conditioned air is used to regulate an amount of trim air that is injected into the conditioned air. In at least some known aircraft, the trim air is injected into the conditioned air flow at a T-joint or Y-joints of varying angles, and the airflow turbulence in the duct mixes the airflows. However, such turbulent mixing does not uniformly mix the airflows before a temperature measurement of the combined airflows is taken. Further, such mixing may limit the position of the trim air injection to only long, straight portions of the ducting. Additionally, it may be difficult to correctly position the duct temperature sensor in the duct to obtain an accurate temperature measurement. For example, if the duct temperature sensor is positioned too far from where the trim air is injected, the mixed airflow may experience heat loss through the duct by the time it reaches the duct temperature sensor leading to low temperature measurements at the duct temperature sensor. When the measured mixed airflow temperature is too low, additional trim air may be injected to warm up the air. However, using more trim air than needed results in the overuse of bleed air and reduces the fuel burn efficiency of the aircraft.

BRIEF SUMMARY

In one aspect, a device for use in mixing airflows in an environmental control system is provided. The device includes a duct configured to receive a first airflow and a second airflow, and a plurality of guide vanes disposed within the duct. The guide vanes are configured to induce rotation of the first and second airflows flowing through the duct.

In another aspect, a method of mixing airflows in an environmental control system is provided. The method includes positioning a device having a duct within an air supply duct to facilitate mixing at least a first airflow and a second airflow between an injection site of the second airflow into the first airflow and a temperature sensor. The method also includes channeling the first and second airflows into the air supply duct and past the device, such that a plurality of guide vanes disposed within the duct induces rotation of the first and second airflows flowing through the duct.

In yet another aspect, a heating, ventilation, and air conditioning (HVAC) system is provided. The HVAC system includes an air duct configured to channel airflow from a compartment and a heated air supply duct coupled in flow communication to the air duct. The heated air supply duct is configured to channel heated airflow to be injected into the airflow. The HVAC system also includes a device coupled downstream from an injection point of the heated airflow into said air duct. The mixing device includes a duct configured to receive the airflow and the heated airflow and a plurality of guide vanes disposed within the duct. The guide vanes are configured to induce rotation of the airflow and heated airflow flowing through the duct.

DETAILED DESCRIPTION

Figure 1:
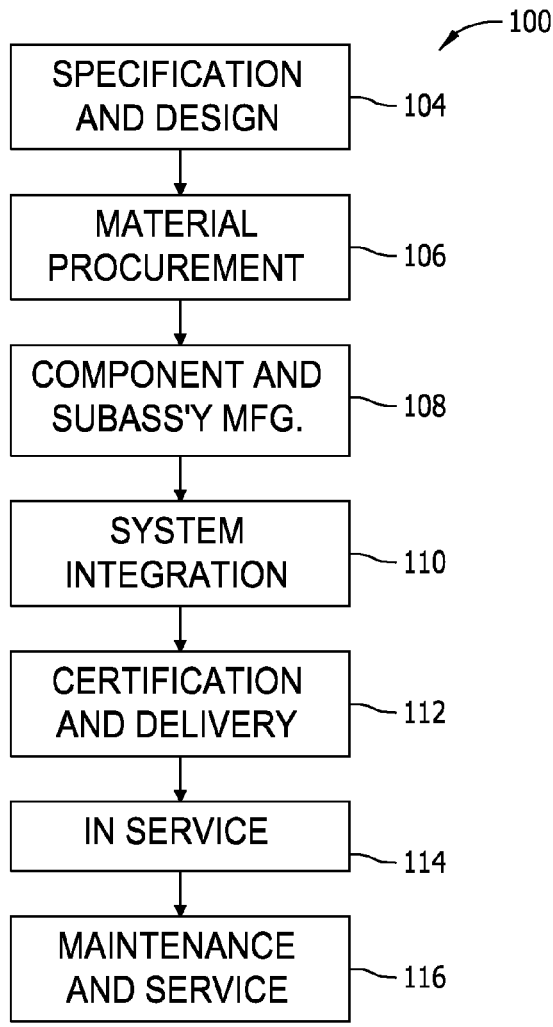
FIG. 1 is a flow diagram of an exemplary aircraft production and service methodology.
Figure 2:
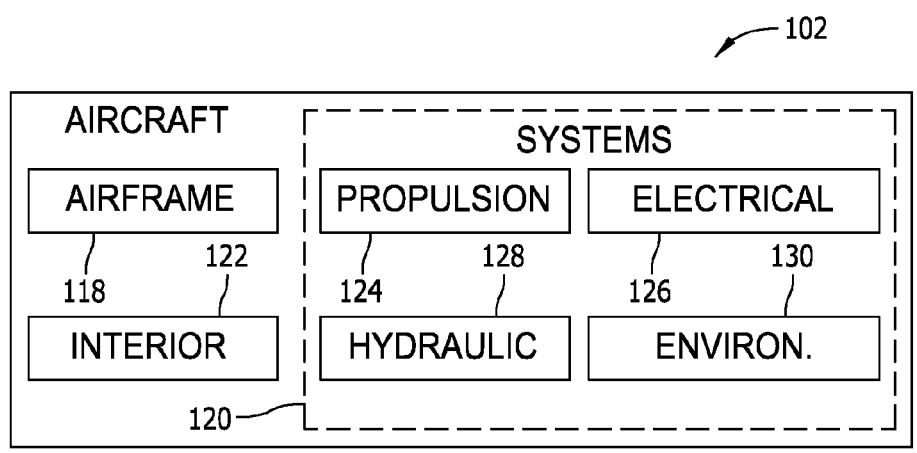
FIG. 2 is a block diagram of an exemplary aircraft that may be fabricated using the system shown in FIG. 1.

The methods and systems described herein are in the context of aircraft manufacturing and service method 100 (shown in FIG. 1) and an aircraft 102 (shown in FIG. 2). Alternatively, the methods and systems described herein may be implemented in any context and/or in any environment involving a fluid distribution system. During pre-production, method 100 may utilize specification and design 104 of the aircraft 102 and/or material procurement 106. During production, component and subassembly manufacturing 108 and system integration 110 of the aircraft 102 occurs. Thereafter, aircraft 102 may go through certification and delivery 112 prior to being placed in service 114. While in service by a customer, aircraft 102 is scheduled for routine maintenance and service 116 (including, for example, modification, reconfiguration, and/or refurbishment).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, an aircraft 102 produced using method 100 may include an airframe 118 having a plurality of systems 120 and an interior 122. Examples of high-level systems 120 may include one or more of a propulsion system 124, an electrical system 126, a hydraulic system 128, and/or an environmental system 130. Any number of other systems may be included. Although an aerospace example is shown, the principles of the invention may be applied to other industries, such as the automotive industry, machinery, heavy equipment, and heating, ventilation, and air conditioning (HVAC) applications.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus implementations, method implementations, or a combination thereof may be utilized during the production stages 108 and 110, for example, by substantially expediting assembly of or reducing the cost of an aircraft 102. Similarly, one or more of apparatus implementations, method implementations, or a combination thereof may be utilized while the aircraft 102 is in service, for example and without limitation, to maintenance and service 116.

Figure 3:
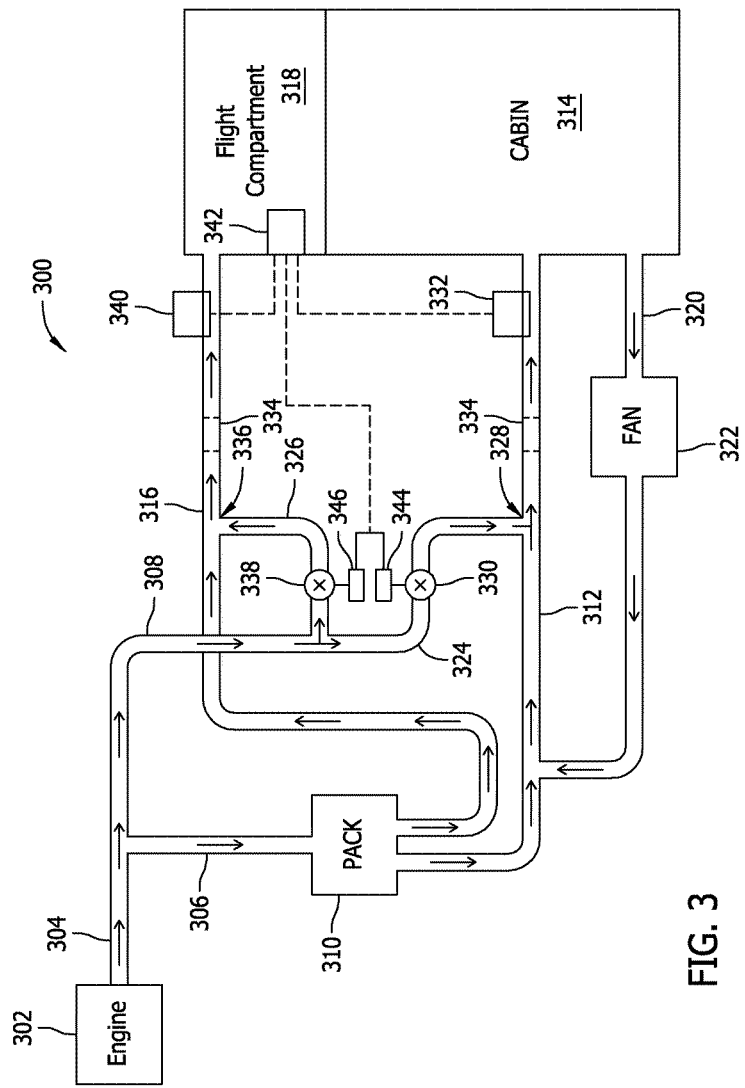
FIG. 3 is a schematic diagram of an exemplary aircraft environmental control system.

FIG. 3 is a schematic diagram of an exemplary aircraft environmental control system (ECS) 300. In the exemplary implementation, ECS 300 is supplied with bleed air received from a compressor (not shown) of an aircraft engine 302 through an inlet duct 304. Inlet duct 304 splits into an air cycle duct 306 and a trim air supply duct 308.

In the exemplary implementation, air cycle duct 306 is coupled in flow communication to an air cycle machine (PACK) 310. PACK 310 is configured to condition and to cool the hot, pressurized bleed air. Downstream from PACK 310, ECS 300 includes ducting for channeling conditioned air into one or more zones of aircraft 102 (shown in FIG. 2). For example, in the exemplary implementation, ECS 300 includes a cabin air supply duct 312 for supplying conditioned air to a passenger cabin 314 of aircraft 102. Additionally or alternatively, ECS 300 includes a flight compartment supply duct 316 for supplying conditioned air to a flight compartment 318 of aircraft 102.

In the exemplary implementation, ECS 300 further includes a cabin recirculated air duct 320 coupled in flow communication to cabin 314. At predetermined time periods, a fan 322 draws air out of cabin 314 for added ventilation to the conditioned air via recirculated air. Cabin recirculated air duct 320 is in flow communication with cabin air supply duct 312 to facilitate mixing the recirculated air from cabin 314 with conditioned air from PACK 310.

In the exemplary implementation, trim air supply duct 308 splits into first and second trim air supply ducts 324 and 326, respectively. First trim air supply duct 324 is coupled in flow communication to cabin air supply duct 312 upstream from cabin 314. Hot trim air is mixed with the cold conditioned air and recirculated air flowing in cabin air supply duct 312 at a cabin trim air injection point 328. In one implementation, first trim air supply duct 324 is perpendicular to cabin air supply duct 312. In another implementation, first trim air supply duct 324 is positioned at an angle, for example, a 45 degree angle, relative to cabin air supply duct 312. The positioning of first trim air supply duct 324 relative to cabin air supply duct 312 facilitates a turbulent mixing of trim air with conditioned air and recirculated air. In the exemplary implementation, ECS 300 includes a first trim air valve 330 for regulating an amount of trim air that is mixed with the conditioned air and recirculated air via first trim air supply duct 324. Regulating the amount of trim air injected into the conditioned and recirculated airflows facilitates controlling a temperature of air entering cabin 314.

Downstream from cabin trim air injection point 328, ECS 300 includes a temperature sensor 332 for measuring a temperature of the mixed trim air and conditioned air and recirculated air entering cabin 314 via cabin air supply duct 312. In the exemplary implementation, ECS 300 also includes a mixing device 334 coupled between trim air injection point 328 and temperature sensor 332. Mixing device 334 is configured to improve mixing of the trim air with the conditioned air and recirculated air, as described in more detail below.

Similarly, second trim air supply duct 326 is coupled in flow communication to flight compartment supply duct 316 upstream from flight compartment 318. Hot trim air is mixed with the cold conditioned air flowing in flight compartment supply duct 316 at a flight compartment trim air injection point 336. ECS 300 also includes a second trim air valve 338 for regulating an amount of trim air that is mixed with the conditioned air via second trim air supply duct 326. In one implementation, second trim air supply duct 326 is perpendicular to flight compartment air supply duct 316. In another implementation, second trim air supply duct 326 is positioned at an angle, for example, a 45 degree angle, relative to flight compartment air supply duct 316. The positioning of second trim air supply duct 326 relative to flight compartment air supply duct 316 facilitates a turbulent mixing of trim air with conditioned air. In the exemplary implementation, ECS 300 includes a second trim air valve 338 for regulating an amount of trim air that is mixed with the conditioned air via second trim air supply duct 326. Regulating the amount of trim air injected into the conditioned air flow facilitates controlling a temperature of air entering flight compartment 318.

Downstream from flight compartment trim air injection point 336, ECS 300 includes a temperature sensor 340 for measuring a temperature of the conditioned air entering flight compartment 318 via flight compartment air supply duct 316. In the exemplary implementation, ECS 300 also includes mixing device 334 coupled between flight compartment air injection point 336 and temperature sensor 340. Mixing device 334 is configured to improve mixing of the trim air with the conditioned air.

In the exemplary implementation, ECS 300 further includes an air management controller 342 located in flight compartment 318. While described herein as being located in flight compartment 318, air management controller 342 may be located in cabin 314, remotely located and controlled from a ground position, and/or any other location that enables controller 342 to function as described herein. Air management controller 342 is communicatively coupled to temperature sensors 332 and 340 to receive the temperature measurements sensed by temperature sensors 332 and 340. Air management controller 342 is also communicatively coupled to a first actuator 344 and a second actuator 346. More specifically, in the exemplary implementation, first actuator 344 is coupled to first trim air valve 330 and second actuator 346 is coupled to second trim air valve 338. Air management controller 342 is configured to calculate a target temperature of the mixed conditioned and recirculated airflow entering cabin 314 that is necessary to achieve a desired cabin air temperature. The desired cabin air temperature may be programmed into air management controller 342 or may be input into controller 342 by a user. As a result, air management controller 342 adjusts a position of first and/or second trim air valve 330 or 338 depending on the application to achieve the desired cabin temperature.

Based on temperature measurements taken by temperature sensor 332, air management controller 342 controls a position of trim air valve 330 to regulate an amount of trim air from first trim air supply duct 324 that is mixed with the conditioned air and recirculated air in cabin air supply duct 312. For example, if the temperature measured by temperature sensor 332 is low, air management controller 342 opens trim air valve 330 to inject additional heated trim air to increase the temperature. Alternatively, if the measured temperature is too high, air management controller 342 closes trim air valve 330 to decrease the amount of heated trim air being mixed with the conditioned air and recirculated air.

Figure 4:
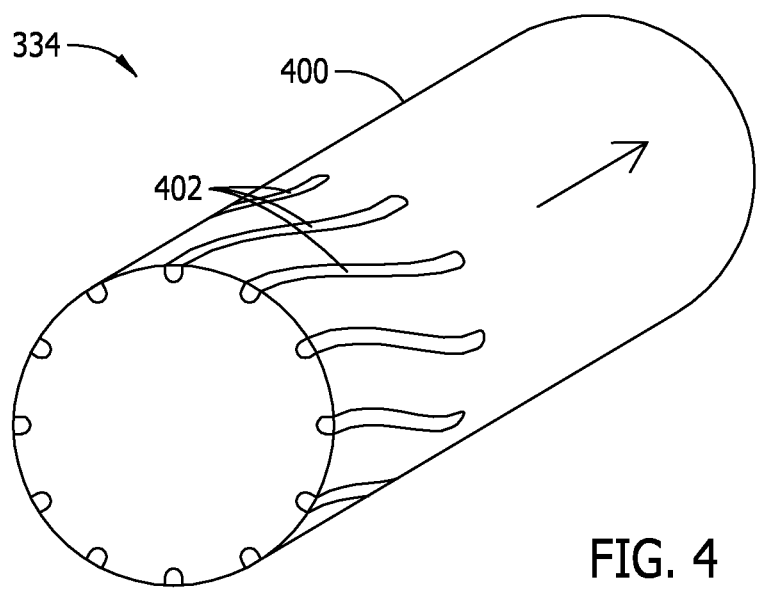
FIG. 4 is an isometric view of an exemplary mixing device that may be used in the ECS shown in FIG. 3.
Figure 5:
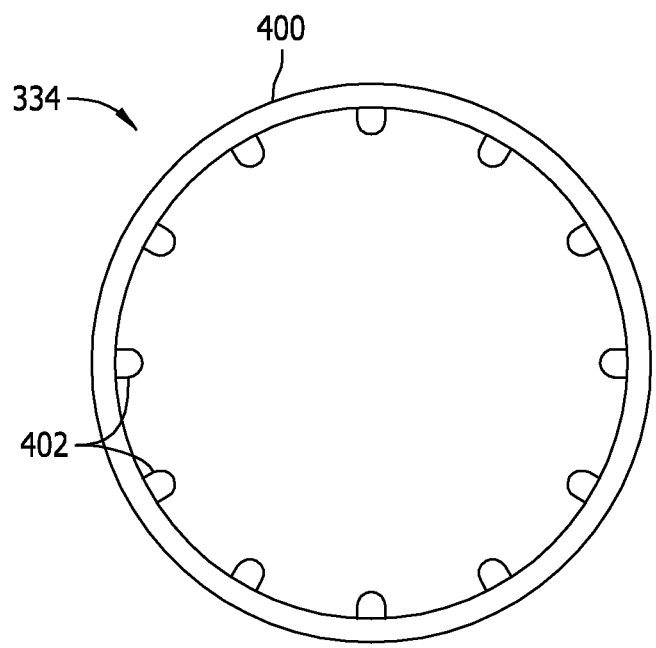
FIG. 5 is a cross-sectional view of the mixing device shown in FIG. 4.

FIG. 4 is an isometric view of an exemplary mixing device 334 that may be used in ECS 300 (shown in FIG. 3). FIG. 5 is a cross-sectional view of mixing device 334 (shown in FIG. 4). In the exemplary implementation, mixing device 334 is positioned within cabin air supply duct 312 (shown in FIG. 3) downstream from cabin trim air injection point 328 (shown in FIG. 3) and upstream from temperature sensor 332 (shown in FIG. 3). While described herein as installed in cabin air supply duct 312, mixing device 334 may also be installed in flight compartment air supply duct 316 in a substantially identical manner, and will not be described.

In the exemplary implementation, mixing device 334 includes a duct 400 and a plurality of guide vanes 402 disposed within duct 400. In the exemplary implementation, duct 400 has a tubular cross-sectional shape. In alternative implementations, duct 400 may have any cross-sectional shape that enables duct 400 to function as described herein, including, but not limited to, a square, a rectangular, or any other non-cylindrical shape. Guide vanes 402 are configured to force axial flows of the trim air, the conditioned air, and recirculated air into a rotational movement to generate a helical vortex (swirl flow) as the trim, conditioned, and recirculated airflows flow through tubular duct 400.

In the exemplary implementation, guide vanes 402 project from an inner surface of tubular duct 400 and are circumferentially spaced at equal intervals. In alternative implementations, guide vanes 402 may be spaced at varying intervals, or at any interval that enables mixing device 334 to function as described herein. Guide vanes 402 are curved downward and skewed with respect to a longitudinal axis of tubular duct 400 in either a clockwise or counter-clockwise direction to form a swirl flow of the mixed air as it flows through mixing device 334. In one implementation, guide vanes 402 are fabricated integrally to cabin air supply duct 312. In another implementation, mixing device 334 is a separate component configured to be installed or retrofit within existing ducting. Furthermore, guide vanes 402 may have any suitable configuration that facilitates mixing of fluids as described herein.

The embodiments described herein facilitate mixing trim air and conditioned air in an ECS more quickly, uniformly, and completely than mixing by turbulence alone. As such, the temperature sensor may be positioned closer to the trim air injection point, which reduces the potential for heat loss and enables the temperature sensor to obtain more accurate temperature measurements of the mixed air. More accurate temperature measurements enable a more precise amount of trim air to be injected, resulting in increased efficiency of fuel burn. Moreover, the improvement in mixing facilitates reducing an amount of necessary ducting in the aircraft, resulting in reduced costs and weight. Additionally, the junctions of ducting at the trim air injection point can be positioned closer to bends in the ducting and/or in shorter straight duct sections, further reducing the amount of necessary ducting required in the aircraft. While described herein as being used in an aircraft environmental control system, the mixing device described herein may be used in any HVAC system.

A technical effect of the systems and methods described herein includes at least one of: (a) positioning a device within a tubular duct to facilitate mixing at least a first airflow and a second airflow between an injection site of the second airflow and a temperature sensor; and (b) channeling the first and second airflows into the tubular duct and past the device, such that a plurality of guide vanes disposed within the tubular duct induces rotation of the first and second airflows flowing through the tubular duct.

The implementations described herein relate generally to ventilation systems and, more particularly, to methods and systems for mixing airflows in environmental control systems. Exemplary implementations of methods and systems for mixing airflows in environmental control systems are described above in detail. The methods and systems are not limited to the specific implementations described herein, but rather, components of systems and/or steps of the method may be utilized independently and separately from other components and/or steps described herein. Each method step and each component may also be used in combination with other method steps and/or components. Although specific features of various implementations may be shown in some drawings and not in others, this is for convenience only. Any feature of a drawing may be referenced and/or claimed in combination with any feature of any other drawing.

An element or step recited in the singular and proceeded with the word "a" or "an" should be understood as not excluding plural elements or steps unless such exclusion is explicitly recited. Moreover, references to "one implementation" of the present invention and/or the "exemplary implementation" are not intended to be interpreted as excluding the existence of additional implementations that also incorporate the recited features.

This written description uses examples to disclose the implementations, including the best mode, and also to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An environmental control system for use in a vehicle, the environmental control system having a first airflow and a second airflow channeled therethrough, the environmental control system comprising:
    an injection site where the second airflow is introduced to the first airflow;
    a trim air valve adjustable to control flow of the second airflow at the injection site;
    a single temperature sensor downstream from the injection site;
    a device for use in mixing airflows, said device comprising:
        a duct configured to receive the first airflow and the second airflow; and
        a plurality of guide vanes disposed within said duct between the injection site and the single temperature sensor, said plurality of guide vanes configured to induce rotation of and substantially uniformly mix the first and second airflows flowing through said duct, wherein the single temperature sensor is configured to measure a temperature of the combined first and second airflows and provides a temperature measurement; and,
    an air management controller coupled to the temperature sensor and configured to calculate a target temperature based solely on the temperature measurement of the single temperature sensor to achieve a programmed compartment temperature, said air management controller adjusting the trim air valve responsive to the temperature measurement.

2. An environmental control system in accordance with claim 1, wherein said plurality of guide vanes is positioned to mix the first and second airflows before a temperature of the mixed first and second airflows is measured by the single temperature sensor.

3. An environmental control system in accordance with claim 1, wherein the temperature sensor is positioned to measure a temperature at a point where the first and second airflows are substantially mixed.

4. An environmental control system in accordance with claim 1, wherein said plurality of guide vanes are configured to force axial flows of the first airflow and the second airflow into a rotational movement to generate a swirl flow as the first and second airflows flow through said duct.

5. An environmental control system in accordance with claim 1, wherein said plurality of guide vanes project from an inner surface of said duct and are circumferentially spaced at equal intervals.

6. An environmental control system in accordance with claim 1, wherein said plurality of guide vanes are skewed along a longitudinal axis of said duct.

7. An environmental control system in accordance with claim 1, wherein said plurality of guide vanes are curved in one of a clockwise and a counter-clockwise direction to form a swirl flow of mixed air as it flows through said duct.

8. An environmental control system in accordance with claim 1, wherein said plurality of guide vanes is fabricated integrally to said duct.

9. An environmental control system in accordance with claim 1, wherein said device is a separate component configured to be retrofit within existing ducting.

10. An environmental control system in accordance with claim 1, wherein the first airflow comprises conditioned air and the second airflow comprises trim air.

11. A method of mixing airflows in an environmental control system, the environmental control system having a first airflow and a second airflow channeled therethrough, the second airflow introduced to the first airflow at an injection site, the environmental control system further including a single temperature sensor downstream from the injection site, said method comprising:
    positioning a device in the environment control system between the injection site and the temperature sensor, the device having a duct and a plurality of guide vanes disposed within the duct, within an air supply duct to facilitate substantially uniformly mixing at least the first airflow and the second airflow;
    channeling the first and second airflows into the air supply duct and past the device, such that a plurality of guide vanes disposed within the duct induces rotation and substantially uniform mixing of the first and second airflows flowing through the duct;
    calculating a target temperature in an air management controller coupled to the single temperature sensor based solely on a temperature measurement by the single temperature sensor of the combined first and second airflows to achieve a compartment temperature; and,
    adjusting a trim air valve with the air management controller responsive to the temperature measurement.

12. A method in accordance with claim 11, further comprising mixing the first and second airflows before measuring a temperature of the mixed airflows with the temperature sensor.

13. A method in accordance with claim 11, further comprising forcing axial flows of the first airflow and the second airflow into a rotational movement to generate a swirl flow as the first and second airflows flow through the duct.

14. A method in accordance with claim 11, further comprising channeling conditioned air and trim air into the device.

15. A heating, ventilation, and air conditioning (HVAC) system comprising:
    an air duct configured to channel airflow from a compartment;
    a heated air supply duct coupled in flow communication to said air duct, said heated air supply duct configured to channel heated airflow to be injected into the airflow at an injection point to form a mixed airflow;
    a trim air valve adjustable to control flow of the heated airflow at the injection point;
    a single temperature sensor configured to measure a temperature of the mixed airflow and provide a temperature measurement; and
    a device coupled downstream from the injection point of the heated airflow into said air duct and upstream from said at least one temperature sensor, said device comprising:
        a duct configured to receive the airflow and the heated airflow;
        a plurality of guide vanes disposed within said duct configured to induce rotation of and substantially uniformly mix the airflow and heated airflow flowing through said duct; and,
    an air management controller coupled to the single temperature sensor and configured to calculate a target temperature based solely on the temperature measurement of the single temperature sensor to achieve a programmed compartment temperature, said air management controller adjusting the trim air valve responsive to the temperature measurement.

* * * * *